United States Patent
Moon

(10) Patent No.: US 8,059,954 B2
(45) Date of Patent: Nov. 15, 2011

(54) SINGLE LENS REFLEX CAMERA COMPRISING A FOCUS DETECTING APPARATUS AND METHOD OF PHOTOGRAPHING

(75) Inventor: Kyoung-Hwan Moon, Yongin-Si (KR)

(73) Assignee: Samsung Electronics Co., Ltd. (KR)

( * ) Notice: Subject to any disclaimer, the term of this patent is extended or adjusted under 35 U.S.C. 154(b) by 10 days.

(21) Appl. No.: 12/578,423

(22) Filed: Oct. 13, 2009

(65) Prior Publication Data

US 2010/0166405 A1  Jul. 1, 2010

(30) Foreign Application Priority Data

Dec. 30, 2008 (KR) .................. 10-2008-0136972

(51) Int. Cl.
*G03B 3/00* (2006.01)
*G03B 13/00* (2006.01)
*G02B 7/04* (2006.01)
*G02B 27/40* (2006.01)

(52) U.S. Cl. ........ 396/104; 396/120; 396/128; 348/350; 250/201.4; 250/201.8

(58) Field of Classification Search ............... 396/104, 396/126–128, 120; 348/345, 348, 349, 350, 348/353–356; 250/201.2, 201.4, 201.6, 201.7, 250/201.8, 201.9
See application file for complete search history.

(56) References Cited

U.S. PATENT DOCUMENTS

2008/0259202 A1*  10/2008  Fujii ........................ 348/345
2008/0317454 A1*  12/2008  Onuki ....................... 396/128

FOREIGN PATENT DOCUMENTS

JP        2005-134617        5/2005

OTHER PUBLICATIONS

English language abstract of JP 2005-134617, published May 26, 2005.
Machine English language translation of JP 2005-134617, published May 26, 2005.

* cited by examiner

*Primary Examiner* — Rochelle-Ann J Blackman
(74) *Attorney, Agent, or Firm* — The Farrell Law Firm, P.C.

(57) ABSTRACT

An SLR camera having a focus detecting apparatus and a photographing method thereof are disclosed. The SLR camera may include an AF sensor, the pixels of which may be disposed in various arrangements, for example, in different sizes, in different gaps between the pixels and/or in different numbers, depending on the location of pixels and a control unit which controls the focusing operation based on the sampling levels output by the pixels.

19 Claims, 7 Drawing Sheets

SINGLE LENS REFLEX CAMERA COMPRISING A FOCUS DETECTING APPARATUS AND METHOD OF PHOTOGRAPHING

CROSS-REFERENCE TO RELATED APPLICATIONS

This application claims priority under 35 U.S.C. §119 from Korean Patent Application No. 10-2008-0136972, filed on Dec. 30, 2008, in the Korean Intellectual Property Office, the disclosure of which is incorporated herein by reference in its entirety.

TECHNICAL FIELD

Apparatuses and methods consistent with aspects of the present disclosure relate generally to a single lens reflex camera and a photographing method thereof, and more particularly, to a single lens reflex camera having a focus detecting apparatus capable of automatic detection of a focus of a subject and a photographing method thereof.

BACKGROUND OF RELATED ART

A wide variety of multimedia applications currently available on-line, e.g., from the Internet, allows users to upload and share photographs taken with a variety of multimedia apparatuses on-line, e.g., through Internet blogs. With such renewed interests in taking and sharing photographs, camera ownership has also seen a sharp rise in the recent years.

Cameras may broadly be classified as single-lens reflex (SLR) cameras, twin-lens reflex (TLR) cameras or rangefinder (RF) cameras according to the type of viewfinder used.

An SLR camera has only a single lens through which users may both view and capture the image of a subject. Light passing through the single lens is reflected by a mirror at approximately 90° angle so that users can view the subject with his or her eyes through the viewfinder. Accordingly, SLR cameras advantageously provides a user with an instant feedback through the viewfinder of whether the subject is in focus or of how clearly a scene can be viewed in the foreground in relation to the background.

A TLR cameras include separate lenses for taking photographs and for the viewfinder, and tend to be relatively expensive and medium-sized cameras.

An RF camera has an additional viewfinder for displaying an image that is similar to the image captured by the objective lens. However, since the viewfinder of the RF cameras is not optically coupled to the object lens, no change appears on the viewfinder screen even when the focus of the objective lens and/or the iris changes. RF cameras generally tend to be small cameras.

While the three camera types have each been in use to varying extents, SLR cameras have been the generally preferred choice for those prefer the viewing of the images as they would be captured by the camera. In the digital era, digital SLR (DSLR) cameras have similarly become widely popular.

A modern camera typically includes an automatic focusing (AF) detecting function, which enables automatic focus adjustment. An AF system generally measures the distance between two images formed on an AF sensor, calculates how far the object lens should be moved to make the subject in focus based on the measured distance, and moves the lens until the subject is in focus.

The focus area of a conventional SLR camera is limited to the central portion of the photographed image due to the optical asymmetry. However, a typical user desires a broader focus area as a preferred feature in a modern SLR camera.

Unfortunately, however, when the focus area is broadened, e.g., to encompass the entire image, the optical asymmetry also increases, and therefore the resulting focus of the image becomes off towards the edges of the image.

As an attempt to address this issue, a lens may be added to an SLR camera. However, there may be spatial limitations in a camera that may make addition of a lens difficult.

An SLR camera that offers a broad focus area while addressing the optical asymmetry without requiring an additional lens is thus desired.

SUMMARY OF THE DISCLOSURE

An SLR camera consistent with an aspect of the present disclosure may comprise an auto focusing (AF) sensor having pixels of different sizes or disposed at different intervals and a control unit. The control unit may be configured to control a focus of the SLR camera based on sampling levels of the pixels.

The size of each of the pixels may be determined according to its respective location in the AF sensor and based on the number of pixels included in a portion of the AF sensor that produces an output having the shortest period among a plurality of outputs produced by different portions of the AF sensor.

The control unit may normalize the plurality of outputs produced by the AF sensor based on the respective sizes of pixels of the different portions of the AF sensor.

The size of each of the pixels included in a period of the plurality of outputs may be the same.

The sizes of the pixels included in a period of the plurality of outputs may be different from each other.

The AF sensor may be configured to produce first and second image outputs in response to an optical input. The pixels may have respective sizes such that those pixels included in a period of the first image output are equal in number as those pixels included in the same period of the second image output.

The AF sensor may produce first and second image outputs in response to an optical input. Each of the first and second image outputs may have at least two periods that are different from each other. The respective sizes of the pixels are such that a predetermined common number of pixels are included in each of the at least two periods of each of the first and second image outputs.

The AF sensor may be configured to produce first and second image outputs in response to an optical input. Each of the first and second image outputs may have at least two periods that are different from each other. The intervals between pixels may be such that each of the at least two periods of each of the first and second image outputs includes pixels in equal number as those pixels included in the shortest one of the at least two periods of the first image output.

The AF sensor may be configured to produce first and second image outputs in response to an optical input. Each of the first and second image outputs may have at least two periods that are different from each other. The intervals between the pixels may be such that each of the at least two periods of each of the first and second image outputs includes pixels in equal number as those pixels included in a reference one of the at least two periods of the first image output.

The AF sensor may be configured to produce first and second image outputs in response to an optical input. Each of the first and second image outputs may have at least two periods that are different from each other. The intervals between the pixels may be such that each of the at least two periods of each of the first and second image outputs includes a predetermined number of pixels.

According to yet another aspect of the present disclosure, an SLR camera may be provided to include an AF sensor and a control unit to control a focus based on sampling levels of the pixels of the AF sensor. The number pixels of the AF sensor may be calculated based on sampling levels output from the pixels.

The AF sensor may be configured to produce first and second image outputs in response to an optical input. Each of the first and second image outputs having at least two periods that are different from each other. The number of the pixels included each of the at least two periods of each of the first and second image outputs may be the least common multiple of respective numbers of pixels included in each corresponding ones of the at least two periods of the first image output and the second image output.

According to even yet another aspect of the present disclosure, an auto focusing device usable in a camera may be provided to comprise an optical unit, an AF sensor and a control unit. The optical unit may be configured to receive an optical input and to separate the received optical input into a first optical input and a second optical input. The AF sensor unit may have a first sensor and a second sensor. The first sensor may have a first plurality of pixels each configured to receive from the optical unit the first optical input. The second sensor may have a second plurality of pixels each being configured to receive from the optical unit the second optical input. Each of the first and second plurality of pixels being configured to output an electrical signal that represents a sampling of respective corresponding one of the first and second optical inputs. A first group of pixels may include select ones of the first plurality of pixels that collectively output the electrical signals of a first period and select ones of the second plurality of pixels that collectively output the electrical signals of the first period. A second group of pixels may include select ones of the first plurality of pixels that collectively output the electrical signals of a second period and select ones of the second plurality of pixels that collectively output the electrical signals of the second period. The first group of pixels having a first arrangement common to its member pixels. The second group of pixels having a second arrangement common to its member pixels but different from the first arrangement. The control unit may be configured to control the focusing of the camera based on a correlation between at least respective electrical signals output by ones of the first plurality of pixels belonging to the first group of pixels and by ones of the second plurality of pixels belonging to the first group of pixels.

The optical unit may comprise a visual field mask having two apertures though which a light passes.

The first and second arrangements may differ in respective sizes of pixels.

The first and second arrangements may differ in respective distances between pixels.

The first and second arrangements may differ in respective number of pixels.

The first and second arrangements may each include equal number of pixels. Pixels in the first arrangement having a common size that is different from a size common to those pixels in the second arrangement.

Those pixels in the first arrangement may have a common size that is substantially same as the size common to those pixels in the second arrangement.

BRIEF DESCRIPTION OF THE DRAWINGS

Various aspects of the present disclosure will become apparent and more readily appreciated from the following description of the embodiments, taken in conjunction with the accompanying drawings, in which.

DETAILED DESCRIPTION OF SEVERAL EMBODIMENTS

Figure 1:
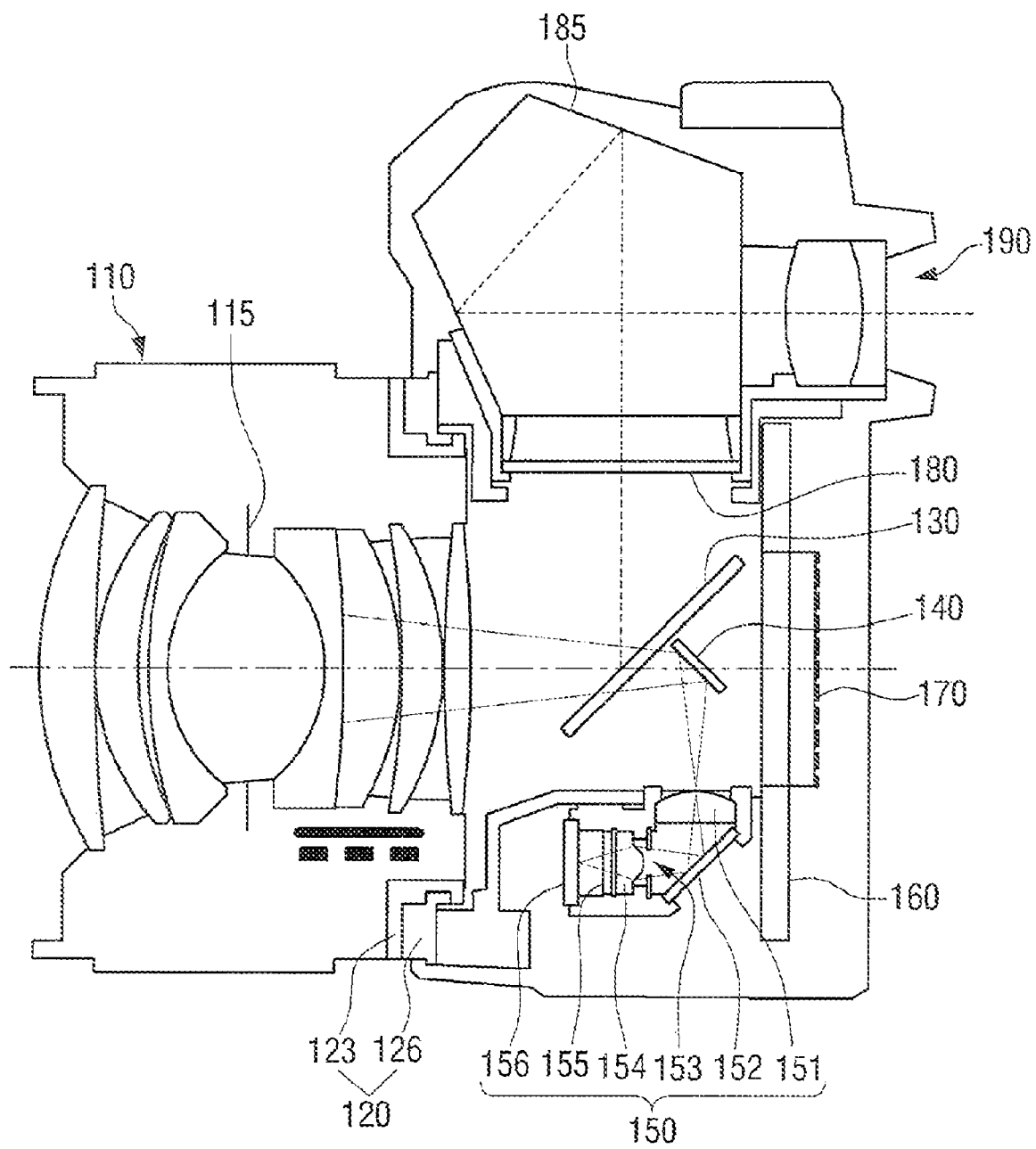
FIG. 1 is a schematic view illustrating the structure of a single lens reflex (SLR) camera according to an embodiment of the present disclosure.

Several embodiments of the present disclosure are described below in detail with reference to the accompanying drawings. While certain descriptions of the embodiments, such as details of construction, elements, features, configurations and/or arrangements, are provided by way of examples in order to assist in a comprehensive understanding of the embodiments, those of ordinary skill in the art will recognize that various changes of and modifications to the embodiments can be made without departing from the scope and spirit of the aspects of the disclosure. Also, well-known functions or constructions may be omitted to provide a clear and concise description of the embodiments without obscuring the same in unnecessary details FIG. 1 is a schematic view illustrating the structure of a single lens reflex (SLR) camera according to an embodiment of the present disclosure. As illustrated in FIG. 1, an SLR camera according to an embodiment may include an objective lens 110, an iris 115, a mount 120, a main mirror 130, a sub mirror 140, an auto focusing (AF) module 150, a focal plane shutter 160, an image pickup area 170, a focusing screen 180, a penta prism 185 and an eyepiece 190.

The objective lens 110 receives light from a subject, and forms an image on the image pickup area 170. The objective lens 110 may include a plurality of lenses arranged as one or more optical groups according to their respective functions.

The objective lens 110 may further include an image stabilizer (IS) (not shown) and an AF motor (not shown). The IS may mitigate the blurring or otherwise undesirable effects on the image quality of the photograph when the camera is moved while taking the photograph, for example, due to the shaking of the user's hand. The AF motor receives AF information from the AF module 150, and moves the lenses for focusing according to the received AF information.

The objective lens 110 may include an iris 115. The iris 115 adjusts the amount of light passing through the objective lens 110, and thus may also affect the depth of field. For example, if the iris 115 is widened, a larger amount of light may pass through the objective lens 110 resulting in a brighter picture. However, the widened iris 115 also enlarges the lens aperture so the depth of field of the resulting photograph may be reduced. On the other hand, if the iris 115 is narrowed, a smaller amount of light may pass through the objective lens 110 so that a photograph of lower brightness can be obtained. The narrowed iris 115 reduces the lens aperture so the depth of field of the resulting photograph may increase.

The iris 115 may be disposed between the plurality of lenses so that images may be formed by the plurality of lenses. In particular, an entrance pupil and an exit pupil may be formed in the optical system. The entrance pupil is usually a virtual image formed by a lens or lenses disposed in front of the iris 115 (i.e., between the subject and the iris) while the exit pupil is also usually a virtual image formed by a lens or lenses behind the iris 115 (i.e., between the iris and the image pickup area). The exit pupil relates to the image that is adjusted by the brightness adjustment function of the iris 115, and may thus be important for adjusting the brightness of photographs, and for performing the AF function.

The mount 120 connects the objective lens 110 to the camera body. The mount 120 may additionally align the center of the image pickup area 170 with the optical axis of the objective lens 110. The mount 120 may be detachably mounted in the camera in order to allow interchanging of the lenses.

The mount 120 may include a lens mount 123 and a body mount 126. The lens mount 123 is engaged with the body mount 126 so that the objective lens 110 may be held in the camera body.

The mount 120 may additionally adjust the back focus of the objective lens 110, and may transfer certain information between the objective lens 110 and the camera body.

The main mirror 130 allows some light to pass therethrough and reflects the remainder of the light. Specifically, the main mirror 130 reflects some of the light passing through the objective lens 110 to the focusing screen 180 so that a user can view the subject image formed on the focusing screen 180 through the eyepiece 190. The light transmitted through the main mirror 130 is used for the focus detection.

The DSLR camera may perform certain through-the-lens (TTL) functions using the main mirror 130. The TTL functions may include, for example, a TTL viewfinder function, a TTL metering function and a TTL distance measurement function, which are performed using light passing through the objective lens 110.

A TTL viewfinder refers to a viewfinder that enables a user to view an image being captured by reflecting the light passing through the objective lens 110. The TTL metering function is performed to measure the brightness of the image being captured using the light passing through the objective lens 110. The TTL metering function may be used in auto exposure (AE) adjustments. The TTL distance measurement function is performed to adjust the focus on the subject using the light passing through the objective lens 110, and may be used for the AF detection.

The sub-mirror 140 may reflect the light that has passed through the main mirror 130 so that the light is reflected by the sub-mirror 140 or by the main mirror 130, and falls incident on the AF module 150. To achieve this, the sub-mirror 140 may be disposed at an acute angle (namely, greater than 0° and less than) 90° with respect to the main mirror 130. The sub-mirror 140 may be disposed perpendicular to the optical axis of the light passing through the objective lens 110, or may be disposed so that the light reflected by the sub-mirror 140 may be re-reflected by the main mirror 130.

By disposing the sub mirror 140 behind the main mirror 130, e.g., in the configuration described above, a single optical apparatus that reflects the light passing through the main mirror 130 back towards the main mirror or toward the AF module 150 may be realized. So configured optical apparatus can provide the light to the AF module 150.

The AF module 150 determines whether the subject is in focus under the control of a control unit 270 which will be explained later. If the subject is out of focus, the AF module 150 transmits a driving signal to the AF motor (not shown) of the objective lens 110 under the control of the control unit 270, so that the subject is in focus. A more detailed description regarding the AF module 150 will be given later with reference to FIG. 3.

The focal plane shutter 160 may be disposed immediately in front of the image pickup area 170 and adjacent to a focal plane of the camera body. The focal plane shutter 160 may be implemented as a pair of black curtains (which may be, e.g., covered by rubbers or metal layers), which are referred to as a front curtain and a rear curtain. During a photographing operation, the front curtain of the local plane shutter 160 opens so that the image pickup area 170 is exposed to light, and the rear curtain thereof closes so as to shield the image pickup area 170 from light. With a focal plane shutter 160 described above, the shutter speed may be adjusted using the time difference between the closing of the front curtain and the rear curtain. The front curtain and the rear curtain may be arranged to travel either vertically or horizontally, but may desirably be arranged to travel vertically.

The focal plane shutter 160 of the above described type may offer the advantages of allowing the use of interchangeable lenses, of the use of lenses with large aperture, of being easily implementable as a high-speed shutter, and of being usable together with an extension ring and a converter. However, the focal plane shutter 160 may have the disadvantages that exposure unevenness could occurs because of the shutter speed changes while the curtains of the focal plane shutter 160 travel across the focal plane. In addition, it may be almost difficult to implement a high-speed shutter at a shutter speed of 1/250 second or faster in stroboscopic synchronization.

The focal plane shutter 160 may alternatively be, for example, a lens shutter, a Thornton shutter or a light value shutter.

The image pickup area 170 is the section in which the subject image is acquired by exposure to light. In the case of a film camera, a film is placed on the image pickup area 170, and in the case of a digital camera, image sensors are disposed on the image pickup area 170. In the following description, an image pickup area 170 of a DSLR camera is described by way of an example.

Image sensors for acquiring the subject image are disposed in the image pickup area 170 of the DSLR camera. Image sensors generally used in digital cameras may include, for example, charge-coupled devices (CCD) and complementary metal-oxide-semiconductors (CMOS) sensors, which may differ in their operational methods being used, but may have substantially the same basic principle.

The focusing screen 180 may include a mat plane and a fresnel lens. The mat plane may be disposed at a position optically equivalent to the focal plane during the photographing operation, and thus may display the same image as the captured image. The fresnel lens collects light that has passed through the mat plane, so that a user may view a much brighter image through the eyepiece 190.

The penta prism 185 is a five-sided reflecting prism. The penta prism 185 changes left and right inverted images formed on the focusing screen 180 to normal images. Accordingly, a user can view through the viewfinder a framed image in the same form as the subject image is observed with the naked eye of the user.

The eyepiece 190 may form a virtual image approximately 1 meter in front of the lens, so as to allow the user to view the image formed on the focusing screen 180. Thus, the user can view an image to be captured through the eyepiece 190.

Figure 2:
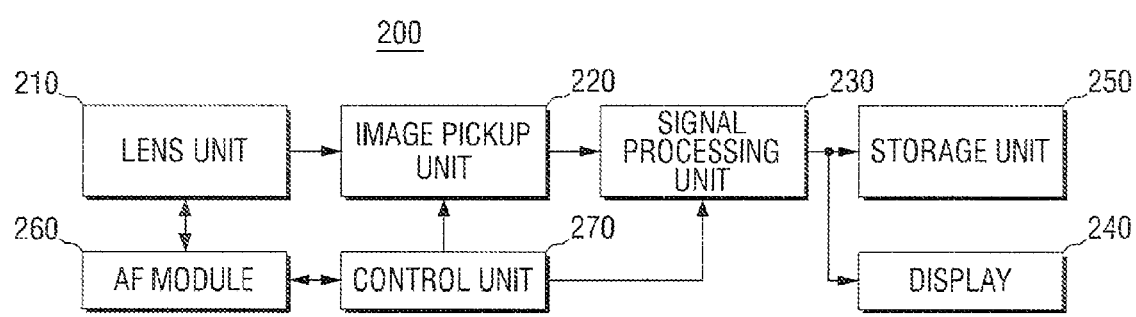
FIG. 2 is a block diagram illustrating relevant components of a single lens reflex (SLR) camera according to an embodiment of the present disclosure.

FIG. 2 is a block diagram illustrating an SLR camera according to an embodiment of the present disclosure.

Referring to FIG. 2, an SLR camera 200 according to an embodiment may comprise a lens unit 210, an image pickup unit 220, a signal processing unit 230, a storage unit 250, a display 240, an AF module 260 and a control unit 270.

The lens unit 210 may further include a zoom lens for enlarging or reducing the size of the subject (not shown), a focus lens for adjusting the focus of a subject (not shown) and an iris 115 (see FIG. 1) for adjusting the amount of light, and may be configured to receive a light signal from an external subject.

The image pickup unit 220 may include an image pickup element that converts the light received through the lens unit 210 into an electrical signal, and may output the electrical signal.

The signal processing unit 230 may perform a signal processing operations such as, for example, adjusting the gain, removing noise, compensating gamma, separating the brightness signal and/or compressing an image signal, on the electric signal output from the image pickup unit 220. The signal processing unit 230 may display the signal-processed image on the display 240, and may store the images in the storage unit 250. Herein, the display 240 may be referring to at least a portion of the view finder.

The AF module 260 may detect the state of the focus of the subject being photographed under the control of the control unit 270, and may transmit or cause the control unit 270 to transmit a driving signal to the AF motor (not shown) to reposition the objective lens 110 so that the subject becomes in focus.

As further described below in greater detail, the control unit 270 according to an embodiment of the present disclosure may adjust the sizes of the pixels of the sensors of the AF module 260 to vary on the basis of the location of each pixel relative to the sampling levels of the image output from the AF module 260. The control unit 270 may compensates the sampling levels with reference to the adjusted pixel size, and may adjust the focus by performing a correlation operation of the compensated sampling levels of the two images output from the AF module 260. While a detailed structure of the control unit 270 is not depicted in FIG. 2, as would be readily understood by those skilled in the art, the control unit 270 may be, e.g., a microprocessor, a microcontroller or the like, that includes a CPU to execute one or more computer instructions to implement the various control operations herein described and/or control operations relating to other components of the SLR camera, and to that end may further include a memory device, e.g., a Random Access Memory (RAM), Read-Only-Memory (ROM), a flesh memory, or the like, to store the one or more computer instructions.

Figure 3:
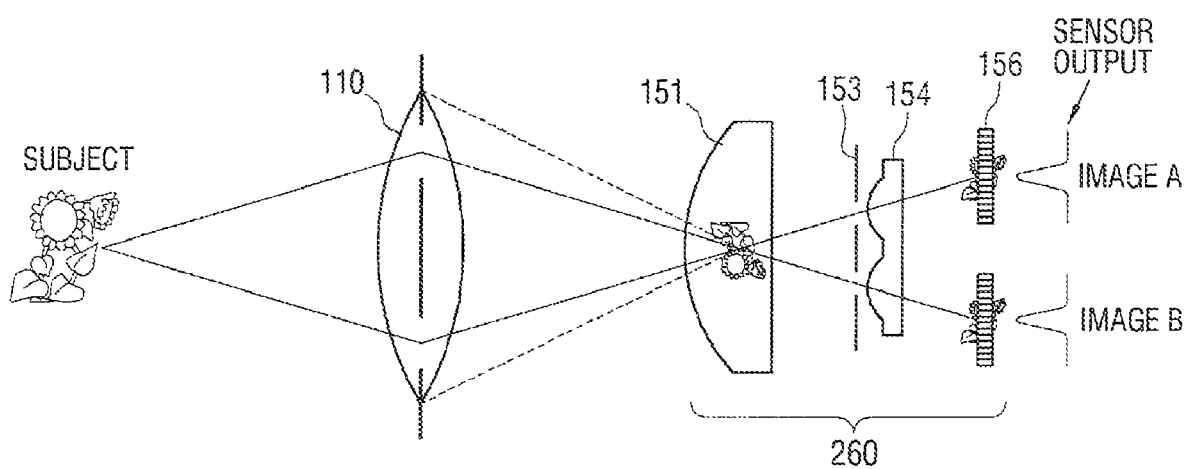
FIG. 3 is a schematic view illustrating the structure of a focus detecting apparatus that may be employed in an SLR camera according to an embodiment of the present disclosure.

Hereinafter, the focus detecting process by the AF module 260 and the control unit 270 according to an embodiment of the present disclosure will be described in greater detail with reference to FIG. 3. FIG. 3 illustrates in greater detail the focus detecting device of the SLR camera according to an embodiment of the present disclosure. For the sake of brevity, descriptions of those features previously described in reference to FIG. 1 are not repeated.

The example of the focus detecting device shown in FIG. 3 is of a phase difference detection type. Referring to FIG. 3, the AF module 260 according to an embodiment may include a field lens 151, a reflective mirror 152 (see FIG. 1), a visual field mask 153, a separating lens 154, a filter 155 (see FIG. 1) and an AF sensor 156.

The field lens 151 may perform the functions of collecting the light incident on the AF module 260, and of projecting an image of the exit pupil of the objective lens 110 onto the visual field mask 153.

The reflective mirror 152 (see FIG. 1) reflects the light incident on the AF module 260 through the field lens 151 towards the AF sensors 156. The reflective mirror 152 may be provided according to an embodiment to change the light path, for example, in order for an efficient utilization of the space in the camera body.

The visual field mask 153 may divide the light formed on the AF sensor 156 into two beams, and to that end may have two slit-like apertures as illustrated in FIG. 3.

The separating lens 154 may cause the two beams passing through the visual field mask 153 to form images on the AF sensors 156, and to that end may includes two convex lenses as illustrated in FIG. 3.

The filter 155 (see FIG. 1) may filter out the light having frequencies other than those in the visible spectrum, in order to prevent errors that may occur by operating the AF sensor 156 with light frequencies of the non-visible spectrum. For example, the filter 155 may be an infrared ray cut filter for filtering out the infrared rays.

The AF sensor 156 may include a plurality of photoelectric elements. The plurality of photoelectric elements may be arranged in pairs in a certain portion of the AF sensor 156 that corresponds to a specific position of the AF area. Examples of photoelectric elements may include a photodiode, for example. A plurality of photodiodes may be disposed in the AF sensor 156. A pixel as that term is referenced hereinafter refers to a unit sensing area of the AF sensor 156, which may include one or more photodiodes or the sensing area of one or more photodiodes.

The AF sensor 156 may perform sampling of the analog signal corresponding to the two light beams that have passed through the visual field mask 153 by converting the light beams into electrical signals, and may output the electrical signals.

The control 270 may detect whether the subject is in focus by comparing the outputs of the pairs of photoelectric elements of the AF sensor 156.

An output of a photoelectric element refers to the signal level that is representative of the sampling of a measurable characteristics of the analog input received by the photoelectric element. For example, an example of the sampled signal level may be the brightness level of the received light input. However, it should be noted that the brightness level is only an example, and that a sampled signal level could be other characteristics associated with the light input, for example, the chromatic level, or the like.

The control unit 270 according to an embodiment may detect whether the subject is in focus by adjusting the sizes of the pixels in each period of the two images, e.g., based the brightness level of the two images output from the AF sensors 156, and may cause appropriate adjustments to bring the subject into focus.

Figure 4:
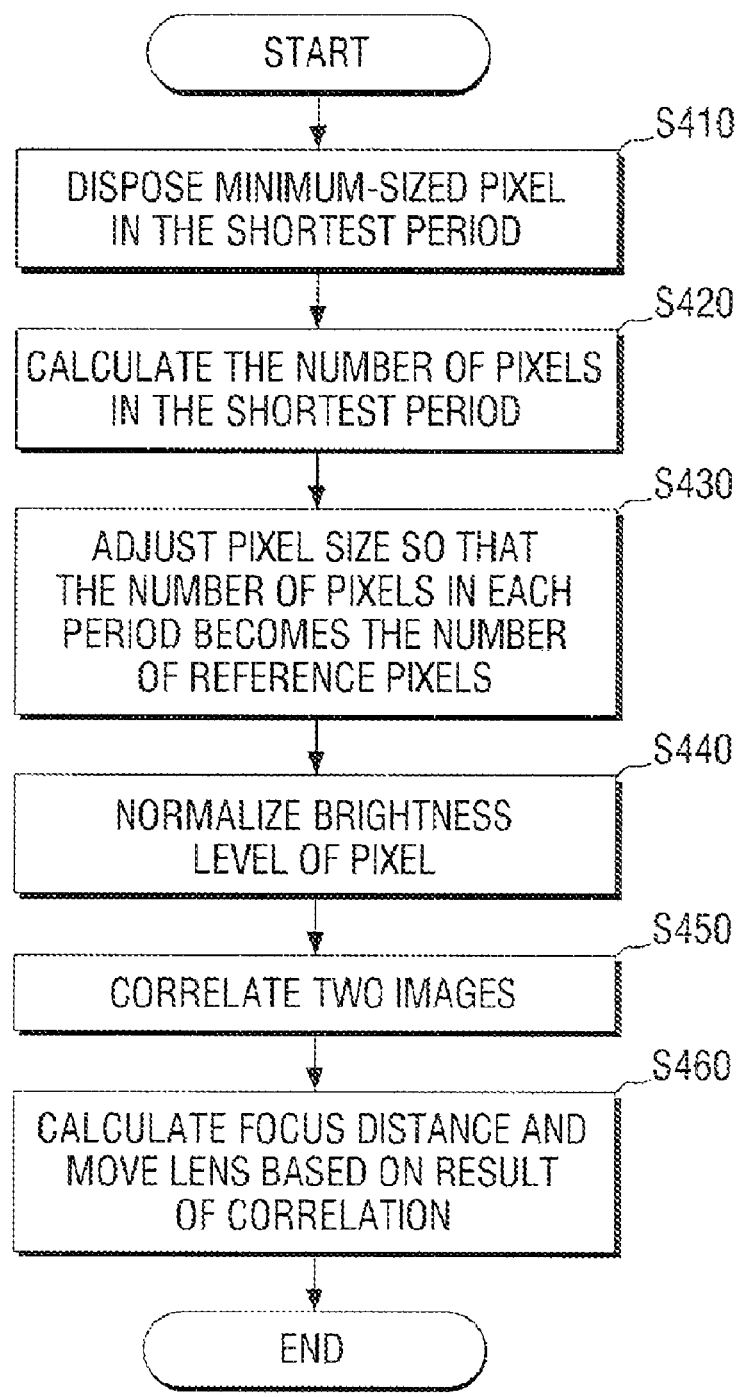
FIG. 4 is a flow chart illustrative of the method of operating an SLR camera according to an embodiment of the present disclosure.
Figure 5:
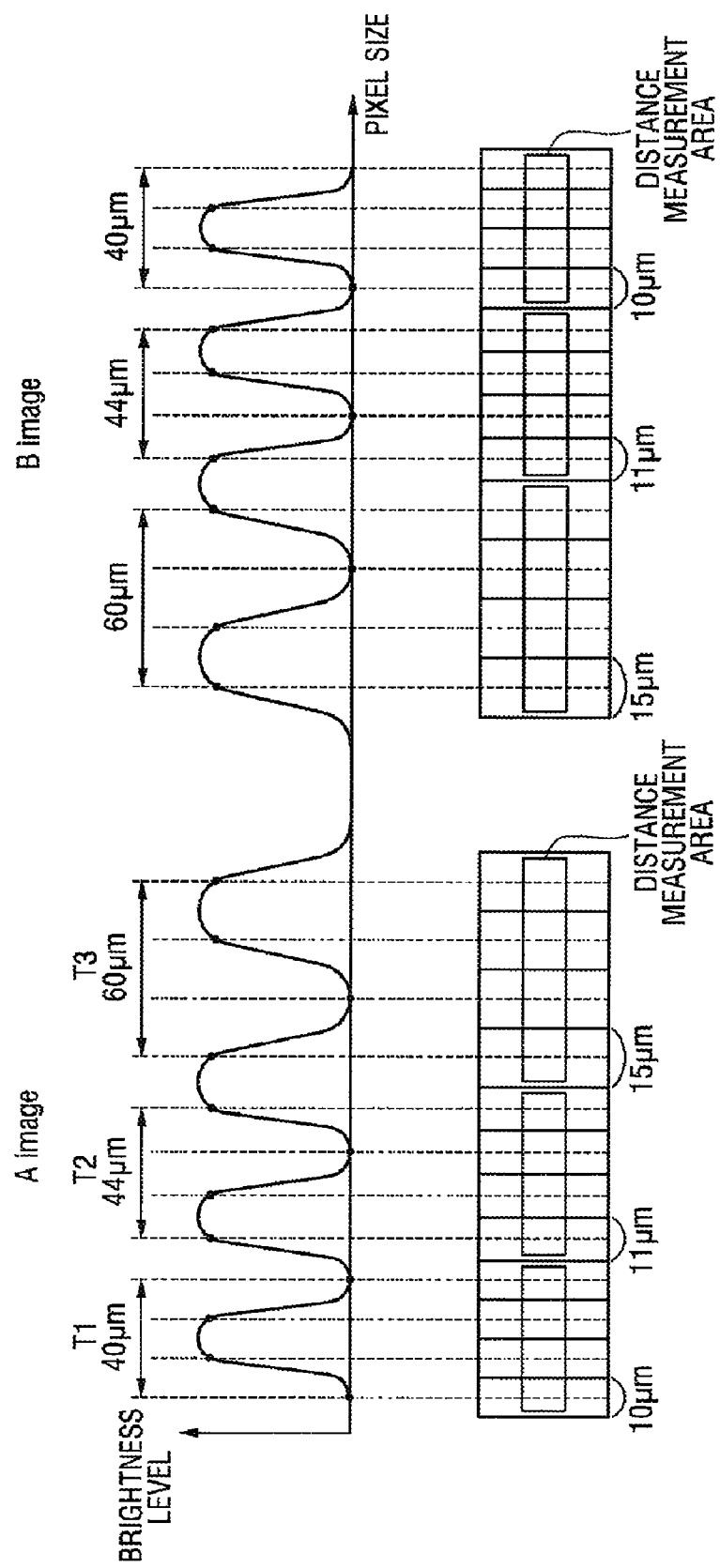
FIG. 5 is a diagram illustrative of the sampling levels for each pixel output from an AF sensor according to an embodiment of the present disclosure.

Hereinafter, the process of adjusting the size(s) of the pixel(s) by the control unit 270 will be described with reference to FIGS. 4 and 5. FIG. 4 is a flow chart of an operational method of an SLR camera according to an embodiment of the present disclosure. FIG. 5 is a diagram illustrative of the sampling levels output from the pixel of the AF sensor according to an embodiment of the present disclosure.

The control unit 270 may choose one of the images A and B formed on the AF sensor 156 to be used as a reference image while the other image to be used as a standard image. According to an embodiment, choosing an image as the reference image or as the standard image may be decided in advance or a certain criteria can be set for a dynamic selection. For the sake of convenience, in the description below, the image A is assumed to have been chosen to be the reference image while the image B is assumed to be the standard image.

If, as shown in process step S410, pixels of a predetermined minimum-size are disposed in the sections of the reference image and the standard image that has the shortest period (e.g., referring to FIG. 5, the period T1 is the shortest period of the reference image A), the control unit 270 calculates the number of reference pixels in a reference image (S420). That is, the control unit 270 calculates the number of the minimum-sized pixels disposed in the shortest period of the reference image output from the AF sensor 156. The reference pixel number represents the number of pixels disposed in the shortest period of the reference image where such period may be predetermined during the designing of the optical system.

For example, according to an embodiment, referring to FIG. 5, the AF module may be produced with the predetermined minimum-sized pixels disposed in an area corresponding to T1, which is the shortest period of the reference image in the AF module. The size of the minimum-pixels may be predetermined to be 10 for example. The control unit 270 calculates the number of reference pixels in T1, e.g., in the above example, four, as the number of reference pixels.

The control unit 270 determines the size of pixels in each of the remaining periods of the images so that the number of pixels in each period of the reference image and the standard image may be the number of reference pixels. According to one specific embodiment, the control unit 270 may determines the size of pixels to be, for example, in a range between about 10 micron (μm) to about 15 μm.

That is, for example, as illustrated in FIG. 5, according to the above example, the control unit 270 may determine the size of the pixels so that the number of pixels in T2 and T3 to each be four. The control unit 270 may determine the size of each pixel in T2 to be 11 μm so that four pixels can be located in T2 whose period is 44 μm, and may determine the size of each pixel in T3 to be 15 μm so that four pixels can be located in T3 whose period is 60 μm.

The control unit 270 may determine the size of pixels for each period of the reference image in the above described manner, and may cause the pixels of the AF sensor 156 according to the determined sizes of pixels. As the pixels whose size is adjusted by the control unit 270 are rearranged in the AF sensor 156, the size of the AF sensor 156 may also change.

In the process step 440, the control unit 270 may normalize the sampled level, e.g., the brightness level, of the output from the pixels of the AF sensor 156 taking into account the size-adjustments of the pixels. For example, the control unit 270 may normalize the brightness level to the extent corresponding or proportional to the adjustment in the size of the pixels in a given period.

As a specific example, suppose that the size of the pixels is adjusted from 10 μm to 20 μm in the section in which the brightness level was originally 100, so that the brightness level after the pixel size adjustment becomes 200. In this case, the control unit 270 divides the sensed brightness level by the multiple of the increased pixel size to normalize the brightness level, i.e., (200*½=100).

The control unit 270 may perform a correlation operation on the reference image and the standard image in which the brightness level is adjusted as described above (S450), and may calculate the focus distance based on the result of the correlation operation.

The control unit 270 causes the objective lens 110 to move based on the calculated distance so that a subject becomes in focus (S460). As the determination of the focus distance through a correlation operation is well known to those skilled in the art, the detailed description of the same is not necessary, and will thus be omitted for brevity.

The operation of an SLR camera which is capable of detecting the in focus state by adjusting the size of pixels for each period of the sampled signal level of images A and B formed on the AF sensor 260 has been explained above. Hereinafter, the operation of an SLR according to another embodiment of the present disclosure capable of detecting the focus status by adjusting the distances between the pixels in images A and B will be explained with reference to FIG. 6.

Figure 6:
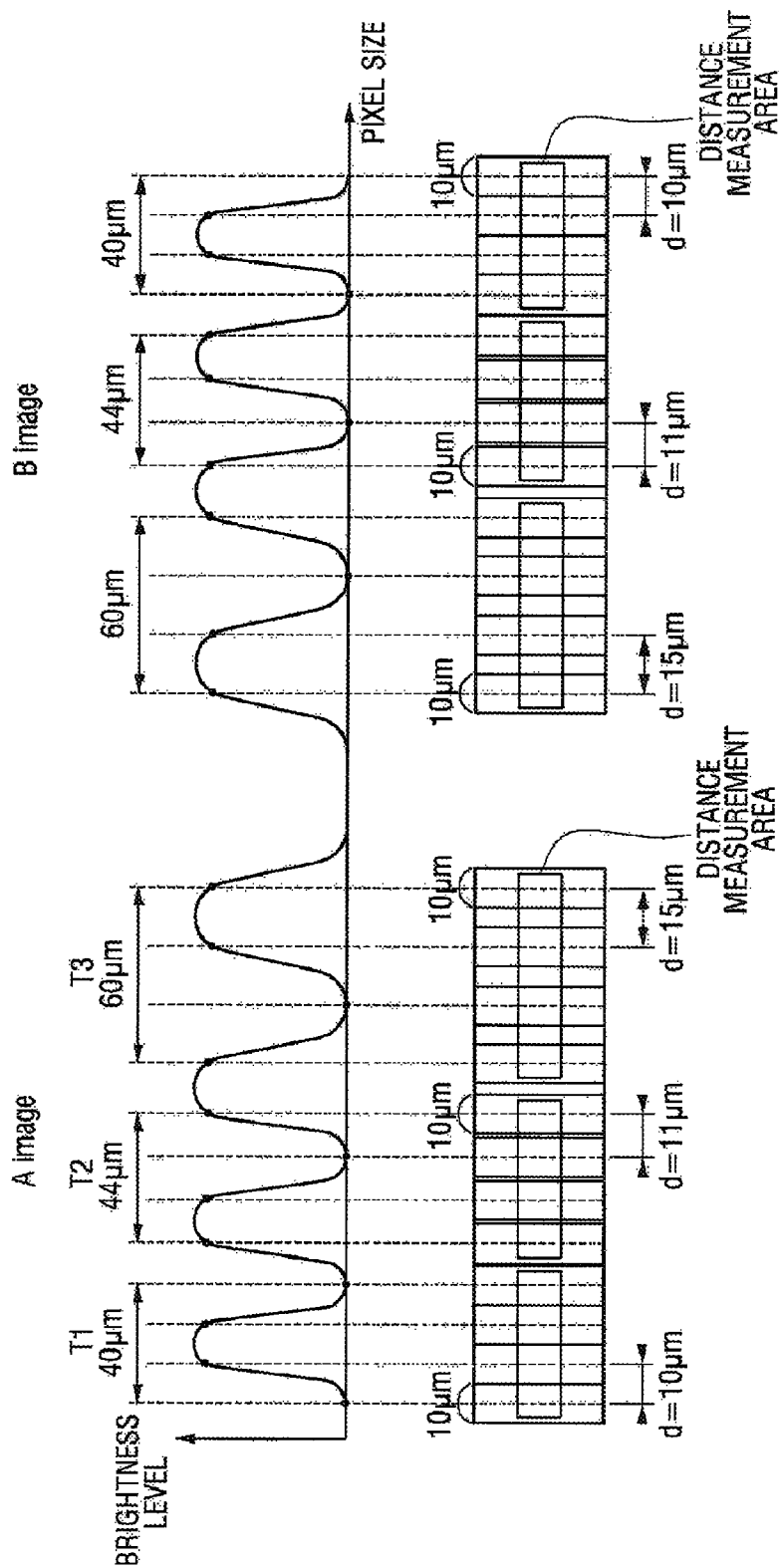
FIG. 6 is a diagram illustrative of the method of detecting the focus in an SLR camera according to an embodiment of the present disclosure.

Referring to FIG. 6, the control unit 270 may calculates the number of pixels in the section in which the image output from the AF sensor 260 has the shortest period, i.e., the number of reference pixels. The AF module may be produced with the minimum-sized pixels disposed in such section of the AF sensor 260.

The control unit 270 may determine the distance between the pixels so that the number of pixels in a given period of image A and image B is consistent with the number of reference pixels. According to this embodiment, while the minimum-sized pixels are described as being disposed in the section of the shortest image period, the pixel size may be the same for the entire AF sensor 260.

For example, if the pixel size and distance between pixels are both 10 μm in the section whose period is T1 (i.e., the shortest period), the control unit 270 determines the distance between pixels in the section having the period 12 to be 11 μm so that the number of pixels in the section T2 is the same as the number of pixels in T1, i.e., four in the example illustrated in FIG. 6. Accordingly, the pixels, in the section of the AF sensor that has the period T2, are disposed at an interval of 11 μm with respect to one another, and may each have the size of 10 μm. Likewise, the control unit 270 may determine the distance between pixels in the section corresponding to the period T3 to be 15 μm, such that there are pixels in the section of period T3 in equal number as the number of reference pixels, i.e., four in the case of the example of FIG. 6. The pixel size according to this embodiment may be the same, e.g., 10 μm, in each of the sections T1 through T3.

The control unit 270 performs the correlation operation on image A and image B output from the AF sensor 260, of which the distance between the pixels in each sections is adjusted as described above, and determines the focus based on the result of the correlation operation.

Figure 7:
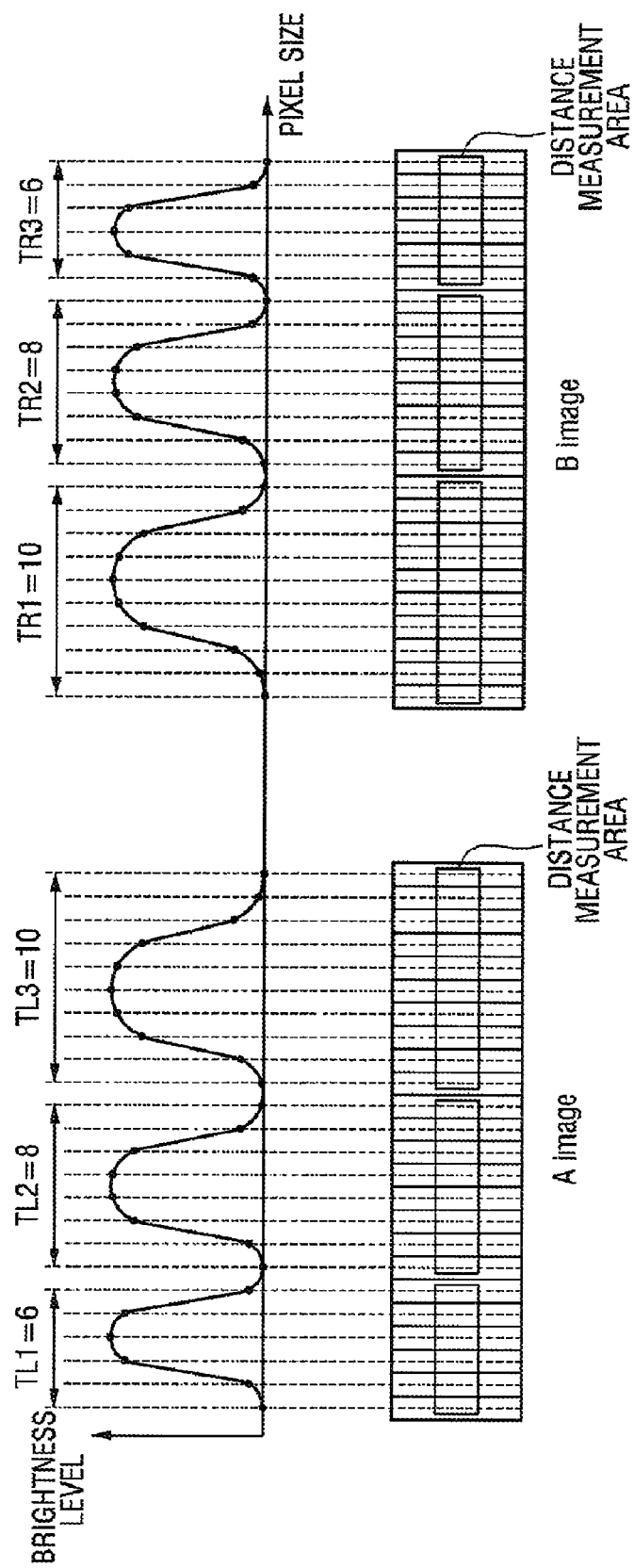
FIG. 7 is a diagram illustrative of the method of detecting the focus in an SLR camera according to another embodiment of the present disclosure.

FIG. 7 is a diagram illustrative of the sampling levels output from the pixel of the AF sensor according to another embodiment of the present disclosure, and will be referred to describe a method of determining the focus status in an SLR camera according to another embodiment of the present disclosure.

Referring now to FIG. 7, the control unit 270 may determine the number of pixels of image A and image B for each period, and may calculate the least common multiple for the determined number of pixels in image A an image B for each period. The AF module may be produced with pixels inserted between pixels so that the number of pixels in each period of image A and image B equal the least common multiple. That is, additional pixels may be inserted to each portion of the AF sensor corresponding to each period of images A and B such that each portion of the AF sensor contain pixels in equal number as the least common multiple associated with that portion of the AF sensor 260.

For example, suppose that the number of pixels in the section $T_{L1}$ of the image A is 6 and that the number of pixels in the section $T_{R1}$ of the image B is 10, as illustrated in FIG. 7. The control unit 270 calculates the least common multiple of 6 and 10, which is 30, and inserts pixels between pixels so that the number of pixels in each of the sections $T_{L1}$ and $T_{R1}$ is 30.

That is, 24 additional pixels are inserted to $T_{L1}$ while 20 additional pixels are inserted to $T_{R1}$. Additional pixels may be inserted to each of sections $T_{L2}$, $T_{R2}$, $T_{L3}$ and $T_{R3}$ in the same manner. As pixels are added, the size of sensor 270 may increase.

In the above description, pixels are inserted so that the number of pixels inserted during the period in which the two images correspond with each other should be the least common multiple, but the present invention need not be so limited. For example, any multiple of the numbers of the pixels respectively of the two corresponding images may be the number of pixels in the sections of the AF sensor 260 corresponding to such two images. That is, additional pixels can be inserted so that the number of pixels in each of the sections of the AF sensor 260 respectively corresponding to $T_{L1}$ and $T_{R1}$ is, e.g., 60, 90, 120 . . . , etc.

The control unit 270 may perform the correlation operation on image A and image B which has the same number of pixels for each period after pixels are inserted as described above, and may determine the focus distance based on the result of the correlation operation.

In the above described embodiments, the pixel size during an image period of the AF sensor may or may not be the same. According to aspects of the present disclosure, the pixel sizes may be set to differ according to the location of pixels. That is, for example, if the pixel sizes in T1 and T2 are described in the embodiments as being 10 μm and 11 μm, respectively, the control unit 270 may further adjust the size of one or more of the pixels in T1 to be 11 μm.

Moreover, while, in the above described embodiments, the number of pixels included in the shortest period of the AF sensor is referred to as the number of reference pixels, the full scope of the aspects of the present disclosure however need not be so limited. For example, the number of reference pixels may alternatively correspond to any other period, e.g., the longest period, or may be predetermined or preset to be a particular number. That is, the control unit 270 may adjust the number of pixels for each period to equal the preset number of reference pixels.

Furthermore, while, in the above described embodiments, the size of the pixels, the distances between the pixels and/or the number of the pixels are described as being determined by the control unit, the full scope of the aspects of the present disclosure however need not be so limited. For example, it may alternatively be an external apparatus connectable to an SLR camera that determines any of the size of, the distances between and the number of pixels.

As described above, according to the embodiment of the present invention, an SLR camera with broader AF area by various arrangements of pixels of the AF sensor.

The foregoing embodiments and features are merely given by way of examples, and are not to be construed as limiting the full scope of the present disclosure, and many alternatives, modifications, and variations of the disclosed embodiments will be apparent to those skilled in the art. Aspects of the present disclosure can be readily applied to other types of apparatuses.

What is claimed is:

1. A single lens reflex (SLR) camera, comprising:
an auto focusing (AF) sensor having pixels of different sizes or disposed at different intervals; and
a control unit configured to control a focus of the SLR camera based on sampling levels of the pixels,
wherein the AF sensor includes a first sensor having a first group of pixels including select ones of a first plurality of pixels that collectively output electrical signals of a first period and select ones of a second plurality of pixels that collectively output the electrical signals of the first period, and a second sensor having a second group of pixels including select ones of the first plurality of pixels that collectively output electrical signals of a second period and select ones of the second plurality of pixels that collectively output the electrical signals of the second period.

2. The SLR camera of claim 1, wherein a size of each of the pixels is determined according to its respective location in the AF sensor and based on a number of pixels included in a portion of the AF sensor that produces an output having the shortest period among a plurality of outputs produced by different portions of the AF sensor.

3. The SLR camera of claim 2, wherein the control unit is configured to normalize the plurality of outputs produced by the AF sensor based on respective sizes of pixels of the different portions of the AF sensor.

4. The SLR camera of claim 2, wherein the size of each of the pixels included in a period of the plurality of outputs is the same.

5. The SLR camera of claim 2, wherein the sizes of the pixels included in a period of the plurality of outputs is different from each other.

6. The SLR camera of claim 2, wherein the AF sensor is configured to produce first and second image outputs in response to an optical input, and
wherein the pixels have respective sizes such that those pixels included in a period of the first image output are equal in number as those pixels included in the same period of the second image output.

7. The SLR camera of claim 1, wherein the AF sensor is configured to produce first and second image outputs in response to an optical input, each of the first and second image outputs having at least two periods that are different from each other, and
wherein the respective sizes of the pixels are such that a predetermined common number of pixels are included in each of the at least two periods of each of the first and second image outputs.

8. The SLR camera of claim 1, wherein the AF sensor is configured to produce first and second image outputs in response to an optical input, each of the first and second image outputs having at least two periods that are different from each other, and
wherein the intervals between pixels are such that each of the at least two periods of each of the first and second image outputs includes pixels in equal number as those pixels included in the shortest one of the at least two periods of the firs image output.

9. The SLR camera of claim 1, wherein the AF sensor is configured to produce first and second image outputs in response to an optical input, each of the first and second image outputs having at least two periods that are different from each other, and wherein the intervals between pixels are such that each of the at least two periods of each of the first and second image outputs includes pixels in equal number as those pixels included in a reference one of the at least two periods of the firs image output.

10. The SLR camera of claim 1, wherein the AF sensor is configured to produce first and second image outputs in response to an optical input, each of the first and second image outputs having at least two periods that are different from each other, and wherein the intervals between pixels are such that each of the at least two periods of each of the first and second image outputs includes a predetermined number of pixels.

11. A single lens reflex (SLR) camera, comprising:
an AF sensor having pixels, the number of which being calculated based on sampling levels output from the pixels; and
a control unit to control a focus based on sampling levels of the pixels,
wherein the AF sensor includes a first sensor having a first group of pixels including select ones of a first plurality of pixels that collectively output electrical signals of a first period and select ones of a second plurality of pixels that collectively output the electrical signals of the first period, and a second sensor having a second group of pixels including select ones of the first plurality of pixels that collectively output electrical signals of a second period and select ones of the second plurality of pixels that collectively output the electrical signals of the second period.

12. The SLR camera of claim 11, wherein the AF sensor is configured to produce first and second image outputs in response to an optical input, each of the first and second image outputs having at least two periods that are different from each other, and wherein the number of the pixels included each of the at least two periods of each of the first and second image outputs is the least common multiple of respective numbers of pixels included in each corresponding ones of the at least two periods of the first image output and the second image output.

13. An auto focusing device usable in a camera, comprising:
an optical unit configured to receive an optical input and to separate the received optical input into a first optical input and a second optical input;
an AF sensor unit having a first sensor and a second sensor, the first sensor having a first plurality of pixels each configured to receive from the optical unit the first optical input, the second sensor having a second plurality of pixels each being configured to receive from the optical unit the second optical input, each of the first and second plurality of pixels being configured to output an electrical signal that represents a sampling of respective corresponding one of the first and second optical inputs, a first group of pixels including select ones of the first plurality of pixels that collectively output the electrical signals of a first period and select ones of the second plurality of pixels that collectively output the electrical signals of the first period, a second group of pixels including select ones of the first plurality of pixels that collectively output the electrical signals of a second period and select ones of the second plurality of pixels that collectively output the electrical signals of the second period, the first group of pixels having a first arrangement common to its member pixels, the second group of pixels having a second arrangement common to its member pixels but different from the first arrangement; and
a control unit configured to control a focusing of the camera based on a correlation between at least respective electrical signals output by ones of the first plurality of pixels belonging to the first group of pixels and by ones of the second plurality of pixels belonging to the first group of pixels.

14. The auto focusing device of claim 13, wherein the optical unit comprises:
a visual field mask having two apertures though which a light passes.

15. The auto focusing device of claim 13, wherein the first and second arrangements differ in respective sizes of pixels.

16. The auto focusing device of claim 13, wherein the first and second arrangements differ in respective distances between pixels.

17. The auto focusing device of claim 13, wherein the first and second arrangements differ in respective number of pixels.

18. The auto focusing device of claim 13, wherein the first and second arrangements each includes equal number of pixels, pixels in the first arrangement having a common size that is different from a size common to those pixels in the second arrangement.

19. The auto focusing device of claim 16, wherein those pixels in the first arrangement has a common size that is substantially same as a size common to those pixels in the second arrangement.

* * * * *